(12) United States Patent
Baughman et al.

(10) Patent No.: US 11,076,202 B2
(45) Date of Patent: Jul. 27, 2021

(54) CUSTOMIZING DIGITAL CONTENT BASED ON CONSUMER CONTEXT DATA

(71) Applicant: INTERNATIONAL BUSINESS MACHINES CORPORATION, Armonk, NY (US)

(72) Inventors: Aaron K. Baughman, Silver Spring, MD (US); Gray Cannon, Miami, FL (US); Stephen C. Hammer, Marietta, GA (US); David Provan, Cobb, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 41 days.

(21) Appl. No.: 15/946,153

(22) Filed: Apr. 5, 2018

(65) Prior Publication Data
US 2019/0313154 A1 Oct. 10, 2019

(51) Int. Cl.
*H04N 21/45* (2011.01)
*H04N 21/442* (2011.01)
*G06Q 30/02* (2012.01)
*H04N 21/81* (2011.01)

(52) U.S. Cl.
CPC ..... *H04N 21/4532* (2013.01); *G06Q 30/0277* (2013.01); *H04N 21/44222* (2013.01); *H04N 21/812* (2013.01)

(58) Field of Classification Search
CPC ............. H04N 21/4532; H04N 21/812; H04N 21/44222; G06Q 30/0277
USPC .......................................................... 725/34
See application file for complete search history.

(56) References Cited

U.S. PATENT DOCUMENTS

| | | | |
|---|---|---|---|
| 6,006,257 A | 12/1999 | Slezak | |
| 6,161,142 A | 12/2000 | Wolfe et al. | |
| 6,906,743 B1 | 6/2005 | Maurer | |
| 8,744,908 B2 | 6/2014 | Kalb et al. | |
| 9,230,547 B2 | 1/2016 | Wilder et al. | |
| 9,729,920 B2 | 8/2017 | Needham et al. | |
| 2003/0149975 A1 | 8/2003 | Eldering et al. | |
| 2007/0288950 A1* | 12/2007 | Downey | H04H 20/103 725/9 |

(Continued)

OTHER PUBLICATIONS

N. Manickam and S. Chandran, "Fast lead star detection in entertainment videos," 2009 Workshop on Applications of Computer Vision (WACV), Snowbird, UT, USA, 2009, pp. 1-6, doi: 10.1109/WACV.2009.5403086. (Year: 2009).*

(Continued)

*Primary Examiner* — Cynthia M Fogg
(74) *Attorney, Agent, or Firm* — Nicholas Bowman; Andrew D. Wright; Roberts Calderon Safran & Cole, P.C.

(57) ABSTRACT

Systems and methods for customizing digital content based on consumer context data are disclosed. In embodiments, a computer-implemented method, comprises: determining, by a computing device, a goodness of fit of one or more digital content segments for a digital product based on asset success metrics indicating a trend in consumer consumption of content; identifying, by the computing device, a select digital content segment from the one or more digital content segments based on the goodness of fit; and incorporating, by the computing device, the select digital content segment into the digital product.

19 Claims, 5 Drawing Sheets

(56) References Cited

U.S. PATENT DOCUMENTS

| | | | |
|---|---|---|---|
| 2008/0216107 A1* | 9/2008 | Downey | H04N 7/17318 |
| | | | 725/22 |
| 2008/0263583 A1* | 10/2008 | Heath | G06Q 30/02 |
| | | | 725/32 |
| 2010/0114682 A1* | 5/2010 | Bosco | G06Q 30/02 |
| | | | 705/14.6 |
| 2010/0131355 A1* | 5/2010 | Kitchen | G06Q 30/02 |
| | | | 705/14.43 |
| 2012/0123811 A1 | 5/2012 | Socolof et al. | |
| 2013/0254787 A1* | 9/2013 | Cox | G06Q 30/02 |
| | | | 725/13 |
| 2014/0269484 A1* | 9/2014 | Dankberg | H04L 12/18 |
| | | | 370/312 |
| 2016/0149956 A1* | 5/2016 | Birnbaum | H04L 63/101 |
| | | | 726/1 |
| 2016/0150260 A1* | 5/2016 | Ovide | H04N 21/2668 |
| | | | 725/12 |
| 2016/0239869 A1 | 8/2016 | Wong et al. | |
| 2017/0199872 A1* | 7/2017 | Krasadakis | G06F 16/2456 |
| 2019/0052933 A1* | 2/2019 | Ho | H04N 21/44008 |

OTHER PUBLICATIONS

S. M. Doudpota and S. Guha, "Automatic actors detection in musicals," Seventh International Conference on Digital Information Management (ICDIM 2012), Macau, Macao, 2012, pp. 226-231, doi: 10.1109/ICDIM.2012.6360136. (Year: 2012).*

Y. Fukushima, T. Yamasaki and K. Aizawa, "Audience Ratings Prediction of TV Dramas Based on the Cast and Their Popularity," 2016 IEEE Second International Conference on Multimedia Big Data (BigMM), Taipei, Taiwan, 2016, pp. 279-286, doi: 10.1109/BigMM.2016.24. (Year: 2016).*

Balachandran et al., "A Quest for an Internet Video Quality-of-Experience Metric" Hotnets '12, Oct. 29-30, 2012, Seattle, WA, 6 pages.

Ulges et al., "Content analysis meets viewers: linking concept detection with demographics on YouTube" Int J Multimed Info Retr (2013) 2:145-157, Dec. 29, 2012, 13 pages.

Anonymous, "Video AI Platform—A Unique Measurement and Analytics Architecture for the Next Generation of TV", https://www.conviva.com/, CONVIVA, accessed Feb. 5, 2018, 6 pages.

Anonymous, "Conviva's Video AI Platform", https://www.conviva.com/about/, CONVIVA, accessed Feb. 5, 2018, 4 pages.

* cited by examiner

CUSTOMIZING DIGITAL CONTENT BASED ON CONSUMER CONTEXT DATA

BACKGROUND

The present invention relates generally to customizing digital content and, more particularly, to customizing digital content based on consumer context data.

Broadcasters of digital content seek to increase audience size and viewing duration by adapting to their audience's preferences. Data sources such as surveys and social media data are commonly used to determine audience preferences. Additionally broadcasters may utilize teams of individuals to view streaming dashboards of popular content. Such dashboards are provided for manual consumption by individuals (individuals viewing and listening to the dashboards) who may manually toggle between source streams or content delivery sources.

SUMMARY

In an aspect of the invention, a computer-implemented method includes: determining, by a computing device, a goodness of fit of one or more digital content segments for a digital product based on asset success metrics indicating a trend in consumer consumption of content; identifying, by the computing device, a select digital content segment from the one or more digital content segments based on the goodness of fit; and incorporating, by the computing device, the select digital content segment into the digital product.

In another aspect of the invention, there is a computer program product for customizing digital content based on consumer context data. The computer program product comprises a computer readable storage medium having program instructions embodied therewith. The program instructions are executable by a computing device to cause the computing device to: identify a content object in a digital product using computer recognition techniques; determine asset success metrics for the content object based on consumer context data, wherein the asset success metrics indicating a trend in consumer consumption of the content object; determine a goodness of fit of one or more digital content segments for the digital product based on the asset success metrics; identify a select digital content segment from the one or more digital content segments based on the goodness of fit and rules in a rules database; and incorporate the select digital content segment into the digital product to create a modified digital product.

In another aspect of the invention, there is a system for customizing digital content based on consumer context data. The system includes a CPU, a computer readable memory and a computer readable storage medium associated with a computing device; program instructions to receiving streaming video data; program instructions to identify a content object in the streaming video data using computer recognition techniques; program instructions to determine asset success metrics for the content object based on consumer context data, wherein the asset success metrics indicating a trend in consumer consumption of the content object; and program instructions to modify contents of the streaming video data based on the asset success metrics; wherein the program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
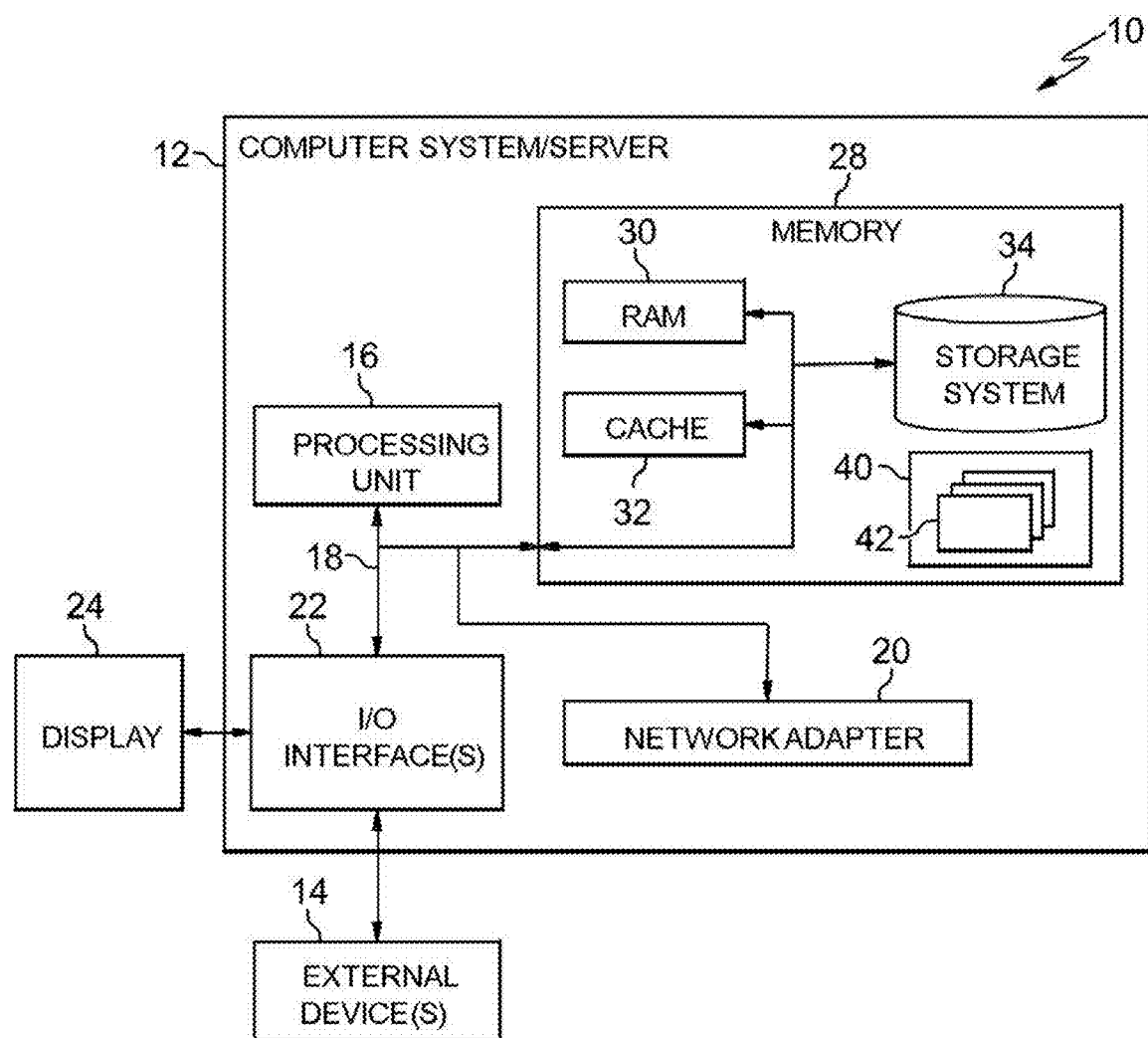
FIG. 1 depicts a computing infrastructure according to an embodiment of the present invention.

The present invention relates generally to customizing digital content and, more particularly, to customizing digital content based on consumer context data. In embodiments, visual recognition and speech recognition technologies are applied to digital content broadcasts to create a data set that can be utilized in the dynamic modification of content. In aspects, visual and speech recognition technologies are utilized to identify people and brand logos in each frame of a video broadcast. In aspects, a computer system collects timestamp data for each identified object (e.g., people and brand logos) in a digital video broadcast and determines the total on-screen time for each identified object. In embodiments, the system communicates brand logo data to third parties (e.g., advertisers) who may have an invested interest in having their logo featured during the video broadcast (e.g., featured signage at a sporting event).

In aspects, people recognition data (e.g., facial recognition data) is utilized in conjunction with a video broadcast's success metrics, such as video plays, audience size and viewer duration. A computer system of the present invention may determine featured people whose presence in a video increases the duration of viewers' streams of the video, and may determine an optimum frequency to feature individuals in a broadcast in order to create broadcast content that is more interesting to an audience. Such optimized broadcasts may lead to improved success metrics and, ultimately, a more attractive investment for advertisers. In embodiments, live video broadcasters are provided with consumer preference data gathered by the system to enable the broadcasters to make real-time adjustments during the broadcast, continuously tailoring the broadcast to its audience's preferences. Further, consumer preference data gathered by the system may be used to programmatically determine the content featured on a website. For example, the data could show that a golfer in a live video broadcast increased (drove) viewer duration. In response, a video clip featuring the golfer could be published to a high visibility position on the website home page for the purpose of increasing viewer duration or viewer traffic of the website.

Advantageously, stakeholders who place logos in video broadcasts can benefit greatly from an automated calculation of on-screen time. This data can provide a clear comparison of the relative value of various logo placements. Additionally, such data may encourage stakeholders to seek agreements which stipulate certain amounts of on-screen time for their logos. In turn, broadcasters can utilize metrics of the present system to ensure that they meet these on-screen time requirements. Moreover, embodiments of the system enable dynamic adjustment of digital video content based on asset success metrics. Thus, a technical solution to digital content modification is provided which enables dynamic content creation and modification based on real-time data.

In accordance with embodiments of the invention, a content analysis processor advantageously: 1) enables facial recognition time series data correlation with asset views; 2) enables speaker recognition time series data correlation with asset views; 3) enhances streams of logo rights by joining content together (i.e., popular asset with unpopular asset to boost views of the unpopular asset); 4) measures brand essence for each brand based on dwell time; 5) places content within specific streams, side cars or sites; and 6) places themed logos with appropriate detected action.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
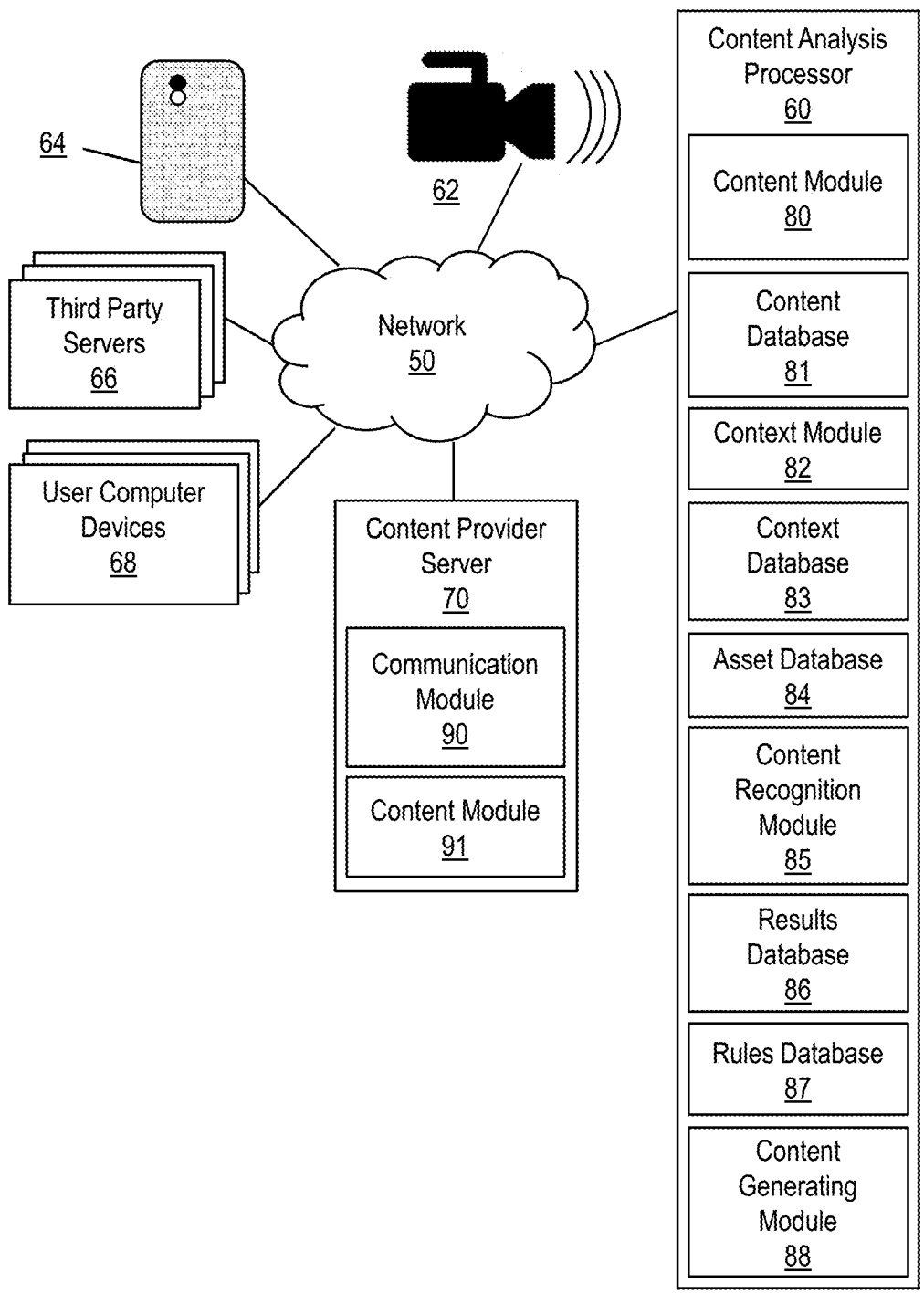
FIG. 2 shows an exemplary environment in accordance with aspects of the invention.

FIG. 2 shows an exemplary environment in accordance with aspects of the invention. The environment includes a network 50 connecting a content analysis processor 60 with one or more of a professional recording device 62, a consumer recording device 64, a third party server 66, a user computer device 68, and a content provider server 70. The content analysis processor 60 may comprise a computer system 12 of FIG. 1, and may be connected to the network 50 via the network adapter 20 of FIG. 1. The content analysis processor 60 may be configured as a special purpose computing device that is part of a content providing infrastructure. For example, the content analysis processor 60 may be configured to dynamically edit digital video or audio content and provide streaming digital video or audio content to multiple user computer devices 68 in real-time or near real-time. Alternatively, the content analysis processor 60 may be configured as a special purpose computing device to provide customized digital video content to the content provider server 70, for distribution through the content provider server 70 to the user computer devices 68.

The network 50 may be any suitable communication network or combination of networks, such as a local area network (LAN), a general wide area network (WAN), and/or a public network (e.g., the Internet). The user computer devices 68 may include components of the computing device 12, and may be a desktop computer, laptop computer, tablet computer, smartphone, television, cable box, etc. Likewise, the consumer recording device 64 may include components of the computing device 12 and may be any consumer recording device 64 such as a digital video recorder or a camera on a user computer device (e.g., a camera of a smartphone). The content provider server 70 may also include components of the computing device 12, and may be a special computing device configured to provide digital content to one or more user computer device 68. For example, the content provider server 70 may be part of a cable and/or satellite television network adapted to provide streaming content to user computer devices 68.

Still referring to FIG. 2, the content analysis processor 60 may include a plurality of modules to perform one or more of the functions described herein, each of the modules including one or more program modules (e.g., program module 42 of FIG. 1). In embodiments, a content module 80 of the content analysis processor 60 is configured to receive digital video or audio content from one or more sources, such as the professional recording device 62 and the consumer recording device 64. In embodiments, the content module 80 stores the received digital content in the content database 81.

In aspects, a context module 82 of the content analysis processor 60 is configured to receive consumer context data such as viewership data and consumer preference data, and store the consumer context data in a context database 83.

In embodiments, the content analysis processor 60 receives asset data (e.g., asset data from the third party server 66) and stores the asset data in the asset database 84. The asset data may include content templates such as templates for logos, background displays, content borders or other digital content segments that may be utilized by the content analysis processor 60 in the creation or modification of digital content. The asset data may also include content object identification data, such as image data of people or logos to be identified by the content analysis processor 60.

In aspects, the content analysis processor 60 includes a content recognition module 85 configured to analyze digital content (e.g., digital video content) to identify select content objects (e.g., people, ideas, logos, etc.) using audio and visual recognition techniques such as facial recognition, voice recognition and text recognition techniques based on asset data stored in the asset database 84. Objects identified by the content analysis processor 60 may be saved in a results database 86, along with timestamp information associated with the identified video objects. The content recognition module 85 may be further configured to determine total onscreen time of recognized content objects based on the timestamp data, and save the resultant onscreen time data in the results database 86. In aspects the content recognition module 85 may also be configured to determine rule compliance by comparing the total onscreen time of an identified video object or asset with asset rules stored in a rules database 87. Rules in the rules database 87 may be obtained from the third party servers 66, user computer device 68, content provider server 70 or other sources. The rules database 87 may contain rules based on viewership and consumer preference data. For example, the rules database 87 may contain a rule stating that the color of a logo should match a background color or colors of associated digital content (e.g. a blue logo should be selected when the background of a modifiable digital content portion contains the color blue).

The content recognition module 85 may share rule compliance data with remote computing devices, such as the third party server 66 or content provider server 70. Moreover, the content recognition module 85 may determine asset success metrics based on timestamp data and consumer context data (e.g., an identified video object is determined to increase consumer video consumption), and save the success metrics data in the asset database 84.

Still referring to FIG. 2, in embodiments, the content analysis processor 60 includes a content generating module 88 configured to automatically modify digital content based on success metrics data stored in the asset database 84. In embodiments, the content generating module 88 utilizes digital content segments (e.g., templates) stored in the asset database, and determines a fit of one or more of the digital content segments for digital content to be modified based on the asset recognition and consumer context data. The term fit as used herein refers to the goodness of fit of a statistical model, which describes how well digital content segments fit a set of observations regarding consumer consumption. The content generating module 88 may select one or more digital content segments for use based on the fit, and insert the selected digital content segments into the digital product to be modified, resulting in modified digital product.

In embodiments, the content analysis processor 60 may include additional or fewer components than those shown in FIG. 2. In embodiments, separate components may be integrated into a single computing component or module. Additionally, or alternatively, a single component may be implemented as multiple computing components or modules. For example, the context module 82 may be remote from the content analysis processor 60 and in communication with the content analysis processor 60 via the network 50.

The quantity of devices and/or networks in the environment of FIG. 2 is not limited to what is shown in FIG. 2. In practice, the environment of FIG. 2 may include additional devices and/or networks; fewer devices and/or networks; different devices and/or networks; or differently arranged devices and/or networks than illustrated. Also, in some implementations, one or more of the devices of the environment of FIG. 2 may perform one or more functions described as being performed by another one or more of the devices of the environment. Devices of the environment of FIG. 2 may interconnect via wired connections, wireless connections, or a combination of wired and wireless connections.

Figure 3A:
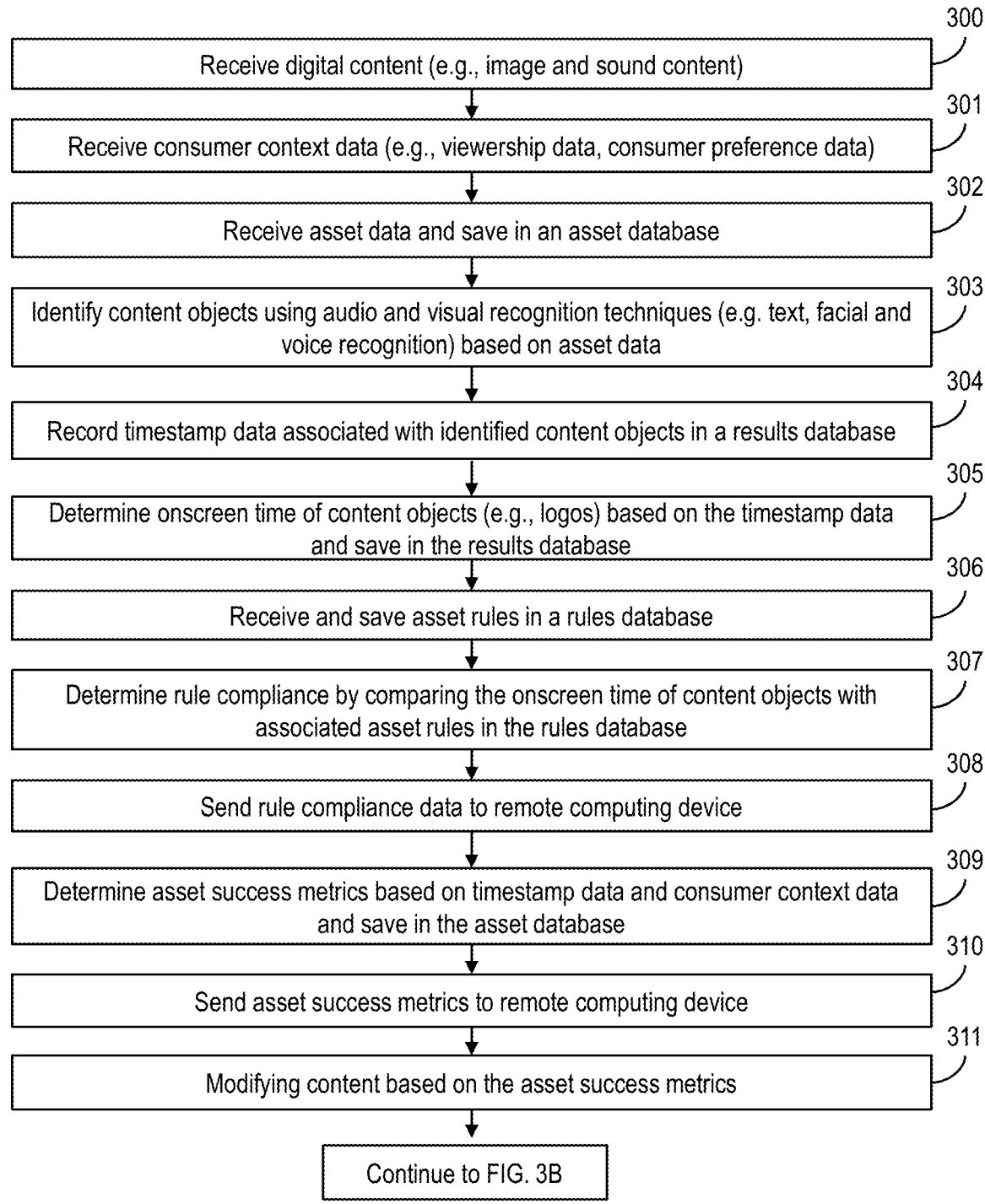
FIGS. 3A and 3B show a flowchart of steps of a method in accordance with aspects of the invention.
Figure 3B:
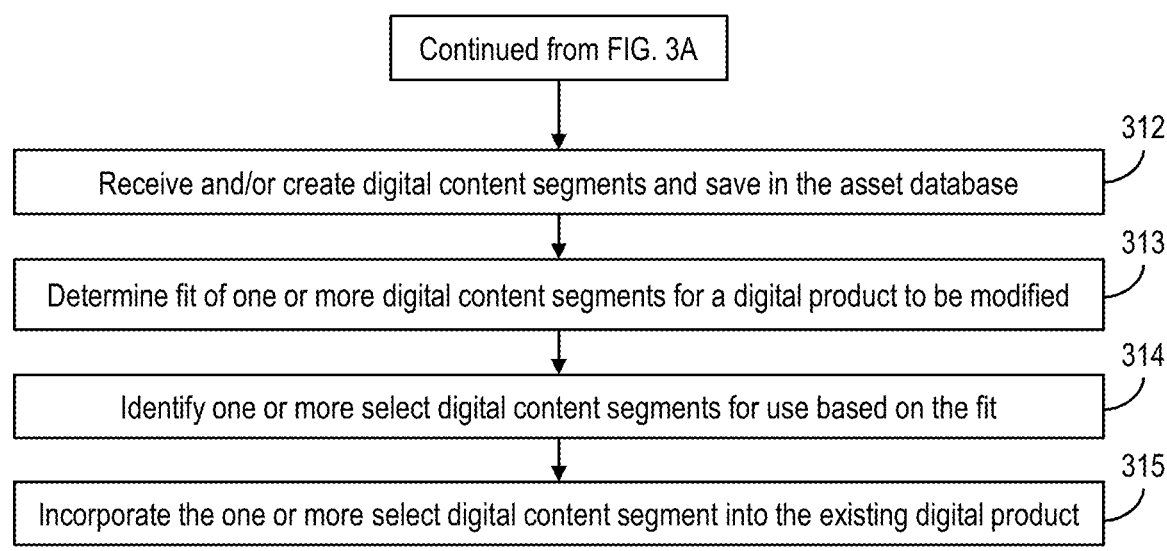

FIGS. 3A and 3B show a flowchart of a method in accordance with aspects of the invention. Steps of the method of FIGS. 3A and 3B may be performed in the environment illustrated in FIG. 2, and are described with reference to elements shown in FIG. 2.

With initial reference to FIG. 3A, at step 300 the content analysis processor 60 receives digital content. In embodiments, the content module 80 of the content analysis processor 60 receives the digital content and saves the digital content in the content database 81. The content analysis processor 60 may receive streaming digital content directly from a digital recorder, such as the professional recording device 62 or the consumer recording device 64, or may receive the digital content from a remote computing device such as the third party server 66 or the content provider server 70 (via the network 50). In aspects, digital content is received at the content analysis processor 60 in real-time as the digital content is being recorded. In aspects, the digital content is in the form of digital video data comprises image and sound data, as well as timestamp data. The digital content may be recorded utilizing existing recording technologies and methods.

At step 301, the content analysis processor 60 receives consumer context data. In embodiments, the context module 82 of the content analysis processor 60 receives the consumer context data and saves the consumer context data in the context database 83. The content analysis processor 60 may receive the consumer context data from a remote computing device such as the third party server 66, the user computer device 68, or the content provider server 70, via the network 50. The consumer context data may include data generated by the content analysis processor 60 in the form of asset success metrics, as discussed in more detail at step 309.

The term consumer context data as used herein refers to a set of observations or data which provides information regarding the consumption of digital content by consumers. In embodiments, the consumer context data comprises viewership data and/or consumer preference data, such as number of video plays, audience size and viewer duration. The viewership data may include data associated with consumers of digital content, such as personal information related to specific consumers (e.g., age, location, gender) and general information regarding viewership (e.g., statistics for geographic regions, etc.). The consumer preference data may include data associated with individual consumer preferences or preferences of broader categories of consumers (e.g., statistical preferences by age, location or gender). Existing sources of consumer context data may be utilized in accordance with methods of the present invention. For example, consumer context data may be compiled from data sources such as surveys or social media data used to determine consumer preferences.

At step 302, the content analysis processor 60 receives asset data and saves the data in the asset database 84. In embodiments, the content analysis processor 60 receives the asset data from one or more remote computing devices, such as the third party server 66 via the network 50. The term asset data as used herein refers to data that can be utilized to identify select video objects (e.g., people, ideas, logos, etc.) using audio and visual recognition techniques such as facial recognition, voice recognition and text recognition techniques. For example, asset data may include data regarding branding, such as trademarks, logos, characters, sounds and colors. The asset data may also include data regarding people, such as image data regarding actors or athletes which may be utilized to identify images of the actors or athletes using facial recognition software.

At step 303, the content analysis processor 60 identifies content objects in the digital content received at step 300 based on asset data stored in the asset database 84. As used herein the term content object refers to an audio or visual object present within digital content which is associated with asset data stored in the asset database 84. The content object may be an image; a sound; an idea; a sentiment; a color; or a combination thereof. The content object may be a concrete image and/or sound, or may comprise images or sounds related to a general category. For example, the content analysis processor 60 may identify a trademark image (content object) in a digital video based on matching the trademark image with a trademark image stored in the asset database 84. In another example, the context of one or more portions of a digital video (e.g., video frames 2,000-4,000) may be identified as matching a context category in the asset database 84 (e.g., a portion of the digital video related to a sporting event may be identified). In yet another example, the sentiment of one or more portions of a digital video (e.g., video frames 2,000-4,000) may be identified as matching a sentiment category in the asset database 84 (e.g., portion of the digital video related to a positive or negative sentiment).

In embodiments, the content recognition module 85 of the content analysis processor 60 utilizes audio, visual and/or text recognition techniques to identify content objects (e.g., people, ideas, logos, etc.). In aspects, the content module 80 and the content recognition module 85 may be combined such that digital content received in accordance with step 300 is received and processed by the content recognition module 85. In particular, live streaming digital content may be directly received at a combined content module 80/content recognition module 85 in accordance with steps 300 and 303. In embodiments, the content recognition module 85 utilizes sentiment analysis tools and methods to determine one or more sentiment categories (e.g., positive sentiment, negative sentiment, anger, happiness, sadness, excitement, etc.) of one or more portions of digital content. In aspects, a context analysis tool may utilize natural language processing (NLP) to parse text into different keywords and sentence fragments in order to statistically relate words and/or phrases to certain context or ideas. The context analysis tool may be implemented at the content analysis processor 60 or at a remote location. In aspects, a remote cognitive computing system receives requests from client devices via application program interfaces (APIs), performs cognitive computing functions based on the requests (e.g., sentiment analysis), and returns results to the client devices based on the performed functions.

With continued reference to step 303, in embodiments, the content analysis processor 60 analyzes digital video content per frame for the presence of one or more content objects. In aspects, the content recognition module 85 identifies the location of content objects in the digital content using timestamps of the digital content. For example, the content recognition module 85 may identify the image of a particular actor at one or more locations in a digital video using timestamps and facial recognition technology. In another example, the content recognition module 85 may identify the presence of a logo within a portion of the digital video using visual recognition techniques and timestamps of the digital video. In aspects, the content recognition module 85 identifies the context of one or more portions of the digital content based on the asset data stored in the asset database 84. For example, the content recognition module 85 may recognize that certain text and words utilized in a particular portion of a digital video (e.g., between timestamp 1 and timestamp 301) indicate that the particular portion is concerned with automobiles, using audio and text recognition techniques. In this example, the content object would be the portion of the digital video contextually associated with automobiles.

At step 304, the content analysis processor 60 records timestamp data associated with content objects identified at step 303. In embodiments, the content recognition module 85 records timestamp data of identified content objects in the results database 86, based on timestamp data associated with the identified content objects. For example, the presence of a trademark in a portion of a digital video between timestamp 1 and timestamp 301 may be recorded in the results database 86. In embodiments, the content analysis processor 60 may record timestamp data indicating multiple appearance of one or more content objects at different locations within a particular piece of digital content.

At step 305, the content analysis processor 60 may determine onscreen time of the content objects identified at step 303, based on the timestamp data saved in the results database 86. In embodiments, the content recognition module 85 determines the total onscreen time of a content object in a digital video (i.e. the total time the content object is present to consumers in the digital video), and saves the results in the results database 86. In aspects, the content recognition module 85 determines the number of appearance of respective content objects identified at step 303.

At step 306, the content analysis processor 60 may receive and save asset rules in the rules database 87. In embodiments, content analysis processor 60 receives the asset rules from a remote computing device, such as the third party server 66 or the content provider server 70. The term asset rules as used herein refers to rules associated with the use of content objects in digital content. For example, a stakeholder (e.g., advertiser) at the third party server 66 may provide the content analysis processor 60 with a rule regarding the number of times a content object should appear in a particular digital video or the total amount of time the content object should appear within the digital video.

At step 307, the content analysis processor 60 may determine rule compliance by comparing the onscreen time of content objects with associated rules in the rules database 87. In embodiments, the content recognition module 85 compares the onscreen time of content objects identified at step 303 with associated rules in the rules database 87 to determine if the digital video complies with the rules in the rules database 87. For example, the content recognition module 85 may compare the total onscreen time of a trademark with a rule in the rules database 87 indicating that the trademark should be displayed for a total of 20 seconds in order to determine if the total onscreen time of the trademark meets or exceeds the predetermined threshold value of 20 seconds. In this example, if the trademark is not displayed in the digital video for at least 20 second based on timestamp data, then the content analysis processor 60 determines that the digital video does not comply with the rule set forth in the rules database 87. Conversely, if the trademark is displayed in the digital video for at least 20 second then the content analysis processor 60 determines that the digital video complies with the rules in the rules database 87 (i.e. the display of the trademark meets or exceeds the threshold value).

At step 308, the content analysis processor 60 sends rule compliance data determined at step 307 to a remote computing device. In aspects, the content recognition module 85 sends information regarding the determined rule compliance of step 307 to one or more third party servers 66 or content provider servers 70. For example, the content recognition module 85 may be configured to send non-compliance alerts to stakeholders (e.g., advertisers) at a third party server 66 when it is determined that a trademark has not been displayed in a digital video for at least 20 seconds in accordance with rules in the rules database 87.

At step 309, the content analysis processor 60 determines asset success metrics based on timestamp data in the results database 86 and the consumer context data in the context database 83, and stores the asset success metrics in the context database 83. In embodiments, the content recognition module 85 of the content analysis processor 60 determines asset success metrics by comparing consumer context data received at step 301 with timestamp data indicating the presence of content objects in one or more portions of a digital video. The term asset success metrics as used herein refers to one or more measurements associated with the success of a content object with respect to the consumption of digital content by consumers. In embodiments, asset success metrics may be associated with different types of content objects including, for example, images, colors, sounds and ideas. The measurements may include measurements regarding trends in consumption of content (e.g., a content object is popular and increases the consumption of digital content when present) or may correlate consumer satisfaction with the appearance of respective content objects (e.g., the appearance of a content object correlates with consumer satisfaction data).

With continued reference to step 309 of FIG. 3A, in aspects, the content analysis processor 60 ranks colors or other content objects based on dwell time of consumers (time consumers spent looking at or consuming the portion of digital content containing the content object of interest). In embodiments, the content analysis processor 60 measures brand essence (e.g., nature or quality of a brand) for brands included in digital content of interest based on dwell time of consumers. In aspects, success metrics may include a scale (e.g., a scale of 1-100) of consumer satisfaction. In embodiments, the content analysis processor 60 is configured to find an optimum frequency of a content object within digital content based on the consumer context data. For example, the content analysis processor 60 may identified featured individuals (e.g., actors or athletes) who drive (increase) video consumption. In the case where digital content is related to a sporting event with many participants, such as golf tournaments, tennis tournaments, and the Olympics, success metrics of step 309 may be utilized to assist directors or other content creators in identifying star athletes and determining the frequency at which featuring the star athletes maximize viewer duration.

At step 310, the content analysis processor 60 sends asset success metrics determined at step 309 to a remote computing device. In aspects, the content analysis processor 60 sends the asset success metrics to one or more third party servers 66 or content provider servers 70. For example, the content analysis processor 60 may send success metrics to a stakeholder (advertiser) at a third party server 66 or a content producer at a content provider server 70. In embodiments, digital content may be dynamically modified by a third party (e.g., content provider) based on the success metrics. For example, success metrics showing that a particular star athlete is popular with consumers may cause a content provider to dynamically modify streaming digital video content as it is being recorded to include more of the star athlete.

At step 311, the content analysis processor 60 modifies content based on the asset success metrics determined at step 309. For example, video content may be streamed to the content analysis processor 60 in accordance with step 300, and the content analysis processor 60 may control the production of the video content based on the asset success metrics determined at step 309. More specifically, the content analysis processor 60 may dynamically edit the sound of a digital video received in accordance with step 300 based on success metrics showing that consumers respond more positively to a first advertising jingle than they do to a second advertising jingle.

Turning to FIG. 3B, at step 312 the content analysis processor 60 receives one or more digital content segments and saves the one or more digital content segments in the asset database 84. The term digital content segment as used herein refers to digital content that can be added to an existing digital product (e.g., a digital video or a website) to modify the content of the digital product, wherein the digital content segments may comprise images, colors, sounds, text, or combinations thereof. For example, digital content segments may comprise customizable templates for logos, backgrounds, borders, or text boxes. In aspects, the one or more digital content segments may be the same as content objects identified at step 303. For example, a trademark identified at step 303 may also be in the form of a digital content segment adapted to be inserted into a digital product. In embodiments, the content generating module 88 of the content analysis processor 60 receives digital content segments from one or more remote computing devices, such as one or more third party servers 66, user computer devices 68 or content provider servers 70. In aspects, the content generating module 88 enables a user to create custom digital content segments for storage in the asset database 84, such as through modifications to existing templates in the asset database 84, wherein the content generating module 88 receives digital content segments from a user interface in accordance with step 312.

At step 313, the content analysis processor 60 determines a goodness of fit of one or more of the digital content segments of step 312 for a digital product to be modified, based on consumer context data and/or asset success metrics. For example, consumer context data stored in the context database 83 may indicate that consumers in a particular geographic location prefer a first advertising jingle over a second advertising jingle. In this example, the content analysis processor 60 determines that the first advertising jingle is a better fit for an advertisement (a recognized video object) in a digital video based on the consumer preference data in the context database 83. In another example, the content analysis processor 60 may determine that a first color palette has a better fit than a second color palette based on the asset success metrics in the context database 83 showing that dwell time is higher for content including the first color palette. In embodiments, the content generating module 88 performs the fit determination of step 313.

At step 314 the content analysis processor 60 identifies one or more select digital content segments for use based on the fit determined at step 313. For example, the content analysis processor 60 may determine that a first advertising jingle is a better fit for an advertisement than a second advertising jingle at step 313, and based on this determination, may choose the first advertising jingle (digital content segment) for use in modifying an existing digital product. In aspects, the content analysis processor 60 identifies one or more select digital content segments for use based on fit and rules in the rules database 87. For example, the content analysis processor 60 may determine that a first digital content segment would be best promoted to consumers if combined with a second digital content segment having a best fit to the existing digital product. In this case, the content analysis processor 60 may identify the first and second digital content segments for inclusion in the existing digital product in an attempt to promote the first digital content segment (which is less popular among consumers than the second digital content segment) by combining it with the more popular second digital content segment. In embodiments, the content generating module 88 performs the determination of step 314.

At step 315, the content analysis processor 60 inserts the one or more select digital content segments determined at step 314 into an existing digital product (websites, digital videos, digital audio data, etc.). It should be understood that the existing digital product may be the same as the digital content received by the content analysis processor 60 at step 300. In embodiments, the content generating module 88 of the content analysis processor 60 performs step 315. For example, the content generating module 88 may insert an advertising jingle (i.e., digital content segment) at the location of an advertisement (i.e., identified content object) in a digital video. Thus, the content analysis processor 60 is configured to customize existing digital products with one or more digital content segments that have been found to be preferred by consumers of the existing digital product.

The insertion of digital content segments into an existing digital product according to step 315 may be performed utilizing digital content editing tools and methods. Such methods enable content such as audio, visual, or textual content to be seamlessly added to existing digital products (digital content segments are synchronized with associated digital content of the existing digital product). In embodiments, the insertion of the one or more select digital content segments occurs during the live recording of digital content. Thus, the content analysis processor 60 may customize received streaming digital content in real-time or near-real time before being distributed the modified digital content to content providers (e.g., content provider servers 70) or directly to one or more consumers (e.g., user computer devices 68). In aspects, the content analysis processor 60 communicates with the communication module 90 of the content provider server 70. In embodiments, customized digital content from the content analysis processor 60 is received by the communication module 90 of the content provider server 70 (e.g., via the network 50) and distributed to consumers (e.g., user computer devices 68) through the content module 80 of the content provider server 70 (e.g., via the network 50).

Figure 4:
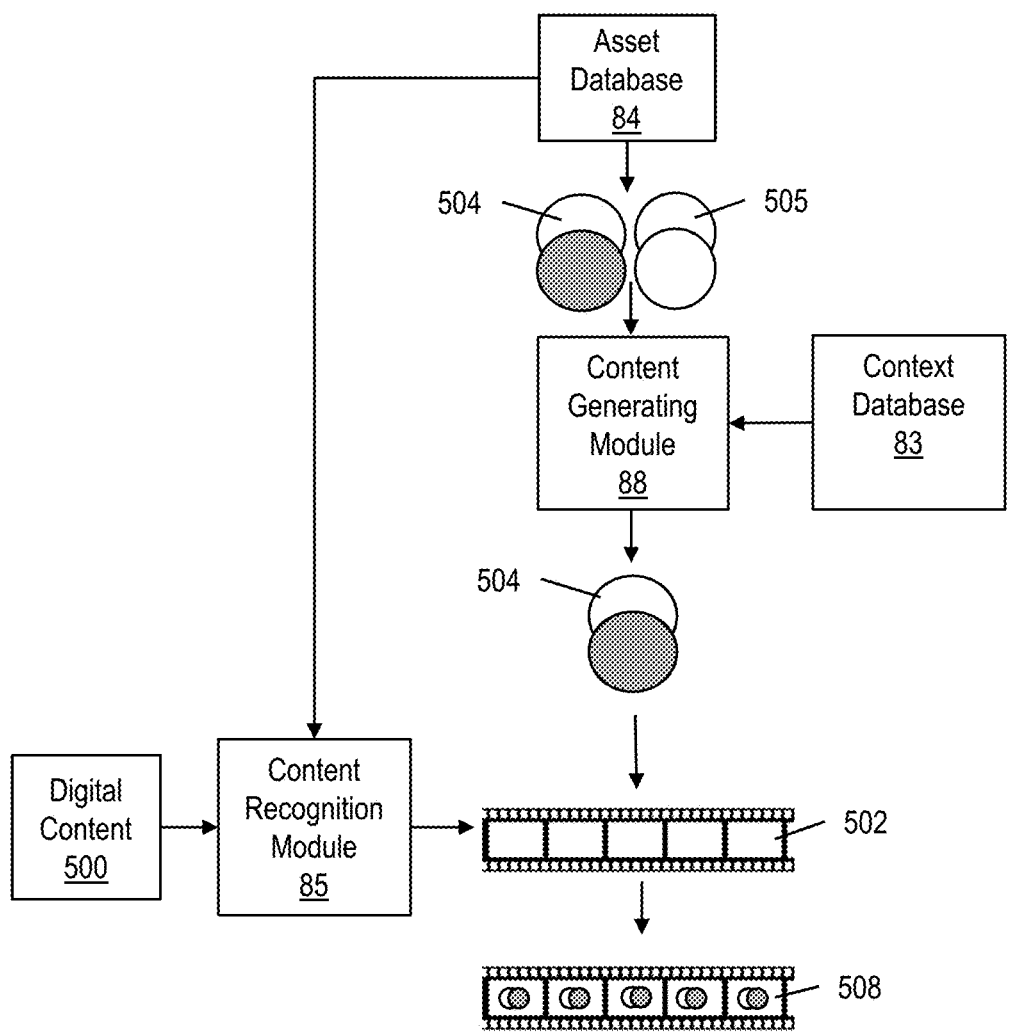
FIG. 4 illustrates an exemplary use scenario in accordance with embodiments of the invention.

FIG. 4 illustrates an exemplary use scenario in accordance with embodiments of the invention. Steps illustrated in FIG. 4 may be performed in the environment illustrated in FIG. 2, and according to the method steps of FIGS. 3A and 3B.

In the exemplary use scenario illustrated in FIG. 4, a live digital video feed of digital content 500 is received at the content recognition module 85 of the content analysis processor 60 (shown in FIG. 2), in accordance with step 300 of FIG. 3A. In accordance with step 303 of FIG. 3A, the content recognition module 85 identifies content objects using audio and visual object recognition techniques. In this exemplary scenario, the content recognition module 85 recognizes a content object 502 in the form of a number of video frames associated with audio advertising for a particular product. More specifically, the content recognition module 85 recognizes audio data associated with a sponsor, which is synchronized with associated video image frames of the content object 502. The asset database 84 includes a first logo 504 (i.e., first digital content segment) associated with the sponsor, as well as a second logo 505 (i.e., second digital content segment) associated with the sponsor, wherein the first logo 504 differs in appearance from the second logo 505. The content generating module 88 determines the fit of the first and second logos 504, 505 (digital content segments) for the digital content 500 to be modified based on the content object 502 and data in the context database 83 (consumer context data and/or asset success data). In this scenario, the asset success metrics in the context database 83 indicate that the first logo should be selected when the background color of the content object 502 is white. That is, asset success metrics data shows that consumers have been shown to prefer (e.g., dwell time is higher for content containing) a contrasting look between a background color and a logo, such that a rule requires the content generating module 88 to utilize a contrasting logo before using a non-contrasting logo. Thus, the content generating module 88 determines that the fit of the first logo 504 (contrasting logo) for the content object 502 is better than the fit of the second logo 505 (non-contrasting logo) for the content object 502, in accordance with step 314 of FIG.

3B. In accordance with step 315 of FIG. 3B, the content generating module 88 next inserts the selected first logo 504 into the video frames of the content object 502, such that the image of the first logo 504 is synchronized with the audio advertising data of the sponsor to create customized digital content 508.

It should be understood that a variety of different content objects and digital content segments may be recognized and utilized in accordance with methods of the present invention. For example, digital content segments in the form of advertising content may be selected based on which version of the advertising content best fits with the preferences of current viewers of a live video feed, based on the context of the feed (e.g., individuals shown, topics discussed, etc.). The advertising content may comprise, for example, a voiceover, slogan, jingle, branding image (e.g., trademark) or other type of digital content for incorporation into an existing digital product (e.g., digital content 500). The fit of a particular digital content segment to a particular content object may be based on consumer preference regarding colors, type of sentiment (happy, serious, etc.), style, language (e.g., accent or regional dialect) or other style characteristic. In embodiments, a logo 504 may be inserted in an existing digital product (e.g., digital content 500) based on the content analysis processor 60 determining that the logo 504 matches (according to rules in the rules database 87) a detected action (skiing, car racing, playing football) occurring as a content object 502 in the existing digital product. In this way, content analysis processor 60 can match themed logos with their associated themes to create customized digital content (e.g., customized digital content 508). It should also be understood that methods of FIGS. 3A and 3B may be utilized to insert select digital content segments within specific digital streams or sites. In aspects, the content analysis processor 60 may selectively insert less popular digital content segments with more popular digital content segments in accordance with rules in the rules database 87 in order to boost or enhance the popularity or viewers of the less popular digital content segments.

Based on the above description of embodiments of the invention, it can be understood that the content analysis processor 60 may perform a method for providing targeted versions of advertising content, the method including: analyzing video content of a live video feed (e.g., individuals shown in the feed, topics discussed by the individuals) and context (e.g., current viewers of the feed) to determine which version of particular advertising content should be included in the video feed at a given time; and incorporating the selected version of the particular advertising content into the video feed at the given time. In aspects, the particular advertising content may be a specific slogan to be used in a voiceover on the video feed, wherein each version of the specific slogan includes a different tone (e.g., volume, sentiment) of how the specific slogan is rendered. In aspects the method may further include selecting a version of the specific slogan with a positive sentiment in order to contrast with a negative sentiment detected in the video content. In embodiments, the particular advertising content may be a specific logo to be displayed over the video feed, wherein each version of the specific logo has a different coloration pattern. The method may further include selecting a version of the specific logo with a particular coloration pattern in order to match with the coloration pattern of other objects in the video feed at the given time.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for customizing digital content. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   identifying, by a computing device, a content object in a digital product based on asset data using computer recognition techniques, wherein the content object includes an image;
   recording timestamp data indicating a location of the content object in the digital product;
   determining, by the computing device, a total time the content object is on-screen during a video broadcast of the digital product based on the timestamp data;
   determining, by the computing device, compliance or non-compliance of the content object with a predetermined asset rule based on the total time the content object is on-screen;
   determining, by the computing device, asset success metrics for the content object by comparing consumer context data with the timestamp data, wherein the asset success metrics comprise measurements associated with success of the content object with respect to consumption of digital content in the digital product by consumers;

determining, by the computing device, a goodness of fit of one or more digital content segments for the digital product based on asset success metrics;

identifying, by the computing device, a select digital content segment from the one or more digital content segments based on the goodness of fit; and incorporating, by the computing device, the select digital content segment into the digital product.

2. The method of claim 1, wherein the one or more digital content segments are selected from a group consisting of: audio data, visual data, and combinations thereof.

3. The method of claim 2, wherein:
the digital product comprises a streaming digital video received at the computing device; and
the determining the goodness fit of the one or more digital content segments occurs concurrently with the receiving of the streaming digital video.

4. The method of claim 1, wherein:
each of the one or more digital content segments comprises a different stylistic version of at least a portion of an advertisement; and
the select digital content segment is determined to have a best goodness of fit for the asset success metrics.

5. The method of claim 1, wherein the content object comprises an image.

6. The method of claim 5, where the at least one content object comprises a negative sentiment expressed by one or more portions of the digital product, and the select digital content segment comprises a positive sentiment.

7. The method of claim 1, wherein the determining the compliance or non-compliance of the content object with the predetermined asset rule comprises determining non-compliance by comparing the total time the content object is on-screen with the predetermined asset rule indicating a threshold value for onscreen time of the content object; the method further comprising:
sending, by the computing device, a notification indicating the non-compliance.

8. The method of claim 1, further comprising modifying, by the computing device, the digital product based on the asset success metrics.

9. The method of claim 8, wherein the modifying the digital product comprises increasing instances of the at least one content object in the digital product based on the asset success metrics.

10. A computer program product for customizing digital content based on consumer context data, the computer program product comprising a computer readable storage medium having program instructions embodied therewith, the program instructions executable by a computing device to cause the computing device to:
identify a content object in a digital product based on asset data using computer recognition techniques, wherein the content object includes an image;
record timestamp data indicating a location of the content object in the digital product;
determine compliance of the content object with a predetermined asset rule based on a total time the content object is on-screen;
determine asset success metrics for the content object by comparing consumer context data with the timestamp data, wherein the asset success metrics comprise measurements associated with success of the content object with respect to consumption of digital content in the digital product by consumers;
determine a goodness of fit of one or more digital content segments for the digital product based on the asset success metrics;
identify a select digital content segment from the one or more digital content segments based on the goodness of fit and rules in a rules database; and
incorporate the select digital content segment into the digital product to create a modified digital product.

11. The computer program product of claim 10, wherein:
the content object comprises an image, a sound, an idea, a context of a portion of the digital product, or a sentiment expressed by a portion of the digital product; and
the one or more digital content segments are selected from a group consisting of: audio data, visual data, and combinations thereof.

12. The computer program product of claim 11, wherein:
the digital product comprises a streaming digital video received at the computing device; and
wherein the determining the goodness fit of the one or more digital content segments occurs concurrently with the receiving of the streaming digital video.

13. The computer program product of claim 10, wherein:
each of the one or more digital content segments comprises a different stylistic version of at least a portion of an advertisement; and
wherein the select digital content segment is determined to have a best goodness of fit for the asset success metrics.

14. The computer program product of claim 10, wherein the identifying the content object comprises identifying multiple content objects, and wherein the program instructions further cause the computing device to:
rank the multiple content objects based on dwell time of consumers with respect to the multiple content objects.

15. The computer program product of claim 10, wherein the program instructions further cause the computing device to: store the asset data received from another computing device, wherein the identifying the content object in the digital product based on the asset data comprises matching the image to an image of the asset data.

16. A system for customizing digital content based on consumer context data, comprising:
a CPU, a computer readable memory and a computer readable storage medium associated with a computing device;
program instructions to receiving streaming video data;
program instructions to identify a content object in the streaming video data using computer recognition techniques;
program instructions to record timestamp data indicating a location of the content object in the streaming video data;
program instructions to determine asset success metrics for the content object by comparing consumer context data with the timestamp data, wherein the asset success metrics comprise measurements associated with success of the content object with respect to consumption of digital content in the digital product by consumers; and
program instructions to modify the content object based on the asset success metrics;
wherein the program instructions are stored on the computer readable storage medium for execution by the CPU via the computer readable memory.

17. The system of claim 16, further comprising:
program instructions to determine a goodness of fit of digital content segments for the streaming video data based on the asset success metrics; and
program instructions to identify a select digital content segment from the digital content segments based on the goodness of fit and rules in a rules database;
wherein modifying the content object comprises incorporating the select digital content segment into the streaming video data to create modified steaming video data, and
wherein the digital content segments are different variations of the same advertising content.

18. The system of claim 17, wherein:
the select digital content segment is in a form of audio data related to the content object;
the content object is in a form of image data; and
the audio data is incorporated into the streaming video data such that the audio data is synchronized with the image data.

19. The system of claim 17, further comprising program instructions to receive modifications to a template to create a modified template, wherein the select digital content segment comprises the modified template.

\* \* \* \* \*